Aug. 4, 1970 N. M. BASHARA ET AL 3,522,590

NEGATIVE RESISTANCE SANDWICH STRUCTURE MEMORY DEVICE

Filed Nov. 3, 1964 2 Sheets-Sheet 1

INVENTOR
NICOLAS M. BASHARA
PAUL H. NIELSEN

BY Stowell & Stowell

ATTORNEY

NEGATIVE RESISTANCE SANDWICH STRUCTURE MEMORY DEVICE

Filed Nov. 3, 1964 2 Sheets-Sheet 2

INVENTORS
NICOLAS M. BASHARA
PAUL H. NIELSEN

Stowell & Stowell
ATTORNEY 3,522,590
NEGATIVE RESISTANCE SANDWICH STRUCTURE MEMORY DEVICE Nicolas M. Bashara, Lincoln, Nebr., and Paul H. Nielsen, Oxon Hill, Md., assignors to Research Corporation, New York, N.Y., a non-profit corporation of New York Filed Nov. 3, 1964, Ser. No. 408,549
Int. Cl. G11c *11/24;* H01g *7/00*
U.S. Cl. 340—173 2 Claims

ABSTRACT OF THE DISCLOSURE

A thin film sandwich displays a hysteresis-like current-voltage curve when subjected to a cycle of increasing-decreasing potential across the sandwich. The initial resistance of the sandwich changes with that voltage at which all voltage is removed. This varying of the initial resistance persists, and is therefore termed a memory effect. The sandwich may be used as a data storage memory device.

The present invention relates to the operation of an analog memory device which employs a thin film sandwich structure containing a dielectric layer which is substantially 300 to 1000 A. thick between metal electrodes. Such structures exhibit a low frequency negative resistance characteristic.

It is an object of the present invention to control the magnitude of the resistance of the sandwich, so that such magnitude may represent a quantity to be stored and later read out for use as a memory element of a computer.

It is a further object of the present invention to apply and remove a low frequency cyclically repeating voltage to a thin film sandwich in such a manner as to induce therein a controllable and reproducible resistance state, to thereby provide a memory element for data storage which can be read out nondestructively and which may be readily erased in a simple manner when other data is to be written in.

A more specific object of the present invention is to precondition a thin film sandwich so that its current-voltage characteristic or initial conductance when a low frequency voltage wave is applied across the two electrodes will, during the first half cycle thereof, possess a determinabie value. Such value depends upon the voltage and current levels of a preconditioning low frequency wave previously applied to the electrode terminals, and is particularly dependent upon that point of the wave cycle at which such preconditioning voltage is removed from the sandwich terminals. Such later value of initial conductance is thus voltage dependent upon the level of the previously applied voltage. A memory effect is provided, since the sandwich device "remembers" the last voltage previously applied to it. When the preconditioning voltage is considered as a write-in voltage having a certain level which is the analog of information to be stored, then the voltage dependent initial conductance value which may be later obtained from the device is a read-out of the stored information.

Since a thin film sandwich structure is a subminiature device, thousands of them may be used in the circuits of a computer without any size and space requirement problems. The use of the sandwich as a memory element has particular advantages in the more sophisticated computer arrangements which need large numbers of multilevel analog storage elements; for example, in an adaptive type of computer arrangement which may be self-taught to simulate the human brain and related nervous system.

Figure 1:
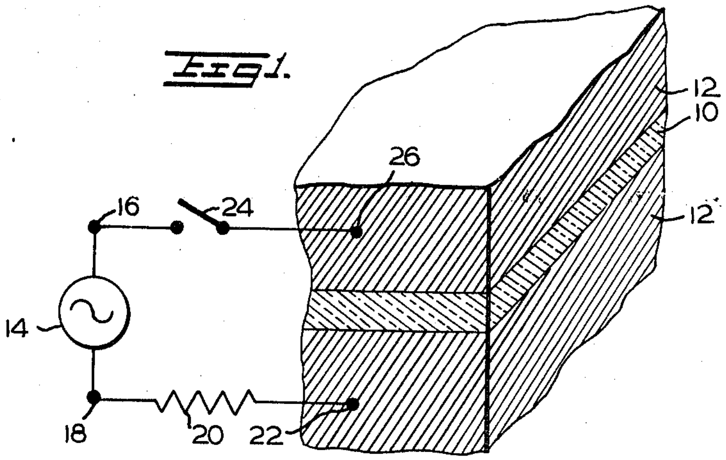

The above and further objects and advantages of the present invention will become apparent from the detailed description thereof which follows, when taken together with the accompanying drawings, wherein:

FIG. 1 is a fragmentary view, to a greatly enlarged scale, of a section of a thin film sandwich structure, showing schematically the electrical circuit associated therewith; and FIGS. 2 through 5 are characteristic curves of the operation of the sandwich structure which are useful in understanding its function as a memory device.

FIG. 1 shows a portion of a sandwich structure containing a dielectric layer 10 of silicon monoxide which is substantially 300 to 1000 A. thick between two gold electrodes 12. Such structures show a low frequency negative differential resistance, as indicated by the curves 28 and 30 of FIG. 3. Such a low frequency negative resistance characteristic is found in a wide variety of sandwich structures.

Techniques for the fabrication of thin film sandwich structures are known. The device shown fragmentarily in FIG. 1 was fabricated by conventional vacuum coating techniques using high purity gold for the material of electrodes 12. The silicon monoxide layer 10 was evaporated using a baffled tantalum boat at a rate of about 10 A./sec. The active area of the individual device may be substantially $5(10)^{-6}$ square meters, which can be expressed as 0.05 square centimeter or $5(10)^{14}$ A.$^2$.

It will be readily apparent that the thickness of the gold electrodes will be many times that of the fragmentary portions shown in FIG. 1, when compared to the thickness of the dielectric layer 10. The thickness of the gold electrodes is immaterial to the operation of the device, except that a sufficient amount of gold should be evaporated so as to insure a minimum voltage drop in the connections to the active area of the sandwich. Typically the sandwich structure is deposited upon a suitably masked substrate of a known dielectric material, such as, for example, a glass slide. Gold strips are evaporated onto the substrate to provide connections from the active sandwich area to terminals at the edge of the substrate. Such substrate, its terminals and connections are not illustrated in the drawings due to the scale used therein. The schematic terminals 22 and 26 are the equivalent thereof. Although a single terminal is shown for each gold electrode, in practice multi-terminals and connections may be used to minimize the voltage drop.

A low frequency source 14 having output terminals 16 and 18 is provided. Terminal 18 is connected to one electrode terminal 22 of the sandwich through a resistance element 20, and terminal 16 is connected to the other electrode terminal 26 by way of a single pole switch element 24.

The thin film sandwich structure is operated in a vacuum enclosure, not shown, at a low pressure of substantially $(10)^{-5}$ torr or less.

Using the circuit arrangement shown schematically in FIG. 1, the curve 28 was obtained after applying for a few cycles a triangular waveform having a frfequency of 0.05 c.p.s.; first increasing the voltage to a maximum value and then decreasing it to zero, etc. This mode of operation will be referred to as normal cycling. Note that the peak current for increasing voltage indicated in curve 28 is less than that for decreasing voltage shown in curve 30. This hysteresis effect is found invariably.

Removing the voltage at various points in the cycle by manually opening switch 24, and reapplying it at either the following or successive points when the voltage is zero, causes a change in the current-voltage characteristic that is different from normal cycling. The change in the characteristic is dependent on the point of voltage removal.

It can be seen in curve 28 showing normal cycling that the voltage for maximum current is about 2.4 volts. Removal voltages, with voltage increasing from a zero value, of less than 1.5 volts have little effect on the characteristic. Reapplication of the voltage by closing switch 24 at successive zero points would result in the same characteristic. However, a removal voltage of about 2.4 volts, voltage increasing, with reapplication at the next zero results in a higher initial conductance than normal cycling, for example, as shown by curve 32. A removal voltage that is greater than the voltage for maximum current, voltage increasing, gives an initial conductance that is much lower than that for normal cycling. The change of initial conductance as a function of removal voltage is shown by the characteristic curve 40 of FIG. 4. Furthermore, this characteristic has a definite break. Curve 42 traces the characteristic of break voltage as a function of removal voltage. It will also be observed that the initial conductance is nearly linear to the break point of curve 40. Also, as the removal potential increases the initial conductance decreases, the break point is more pronounced, and the maximum current is less. These effects can be seen in curve 34 with a removal voltage of 5.9 volts, and curve 36 where the voltage was removed from the sandwich at 3.0 volts.

This voltage dependent initial conductance described above has been termed a memory effect since the device "remembers" the last voltage applied to it. The memory effect is observed only on the first half cycle immediately following the reapplication of voltage. The effect persists reliably over long periods of time. The removal of the voltage from the sandwich by manually opening switch 24 is a sudden removal when considered relative to the time period of the low frequency wave from source 14. It is such sudden voltage removal which alters the subsequent current-voltage characteristic, particularly the initial conductance, until the reapplied voltage exceeds the value for maximum current as shown by the described curves of FIG. 3.

However, we have determined that a high initial resistance can be read out for long periods of time as long the voltage is kept well below that for maximum current. This can be seen in FIG. 2. Here a 60-c.p.s. voltage is applied to the device from the source 14. From its terminals 16 and 18 a voltage is applied to the $x$ axis, and the voltage drop across resistor 20 to the $y$ axis, of an oscilloscope. The locus of the current-voltage plot traces out a negative resistance curve 44. In one test example, as the peak value of the 60-c.p.s. voltage was increased slowly from zero to about 7-volt peak, the current increased to a maximum value of 120 ma. as indicated by curve 46 before onset of negative resistance. The terminal voltage for maximum current was about 3 volts which included a voltage drop due to the resistance of the evaporated gold strips leading from the terminals at the edge of the substrate to the active area. Total connecting resistance was about two ohms. Also, note that as the voltage is increased beyond 3 volts the current abruptly drops to a near-zero value which is maintained out to the 7-volt peak. As the 60-c.p.s. voltage is decreased from this peak value the curve 44 is traced. There are two negative resistance curves 44 in FIG. 2. The upper is for voltage increasing; the lower for voltage decreasing; from an initial zero value.

Figure 2:
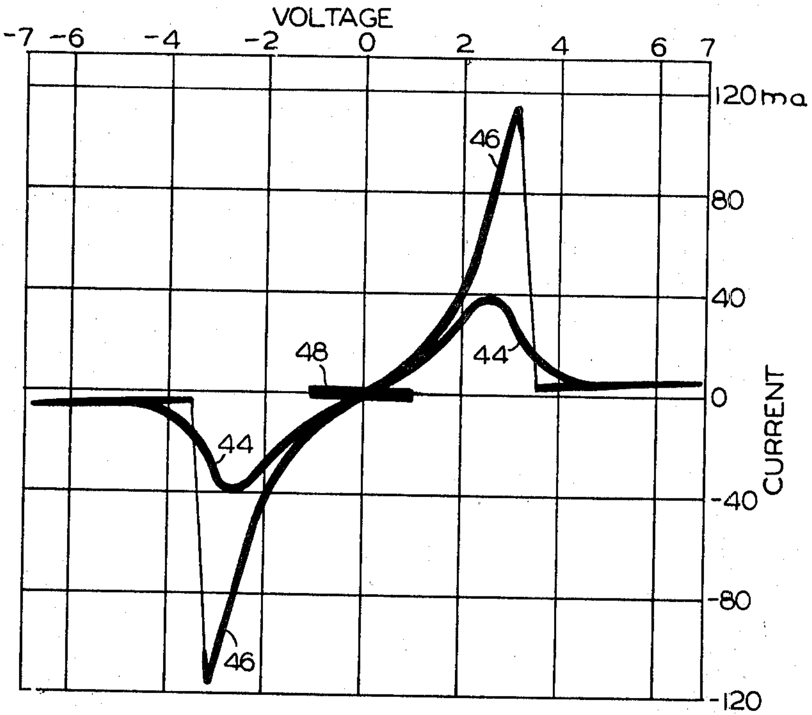
Figure 5:
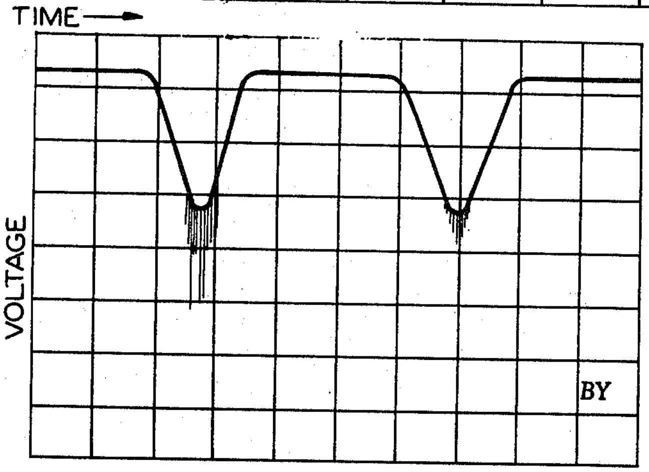
Figure 3:
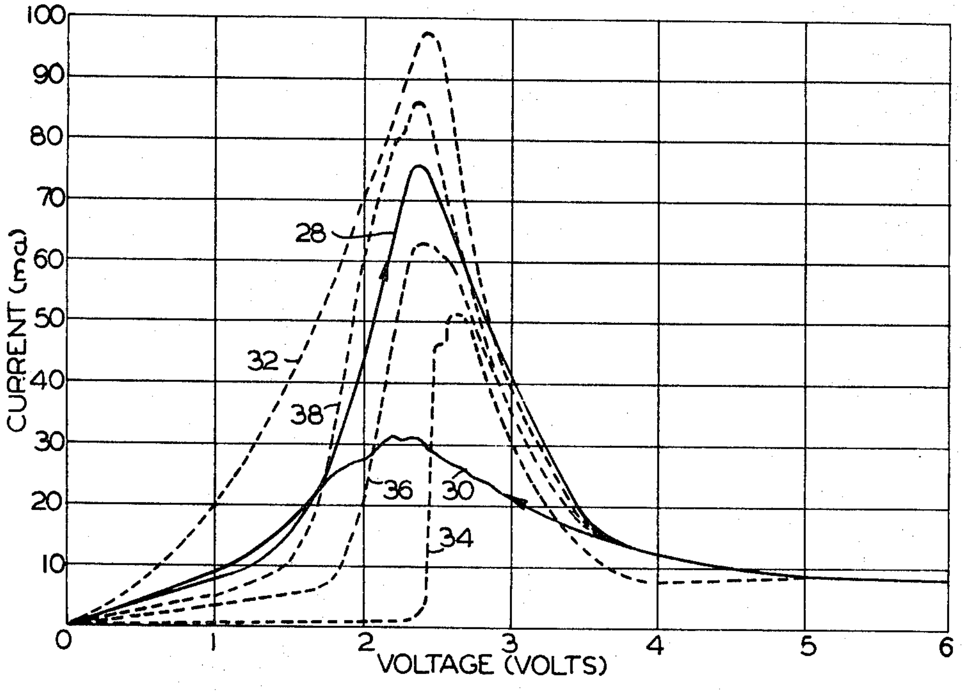
Figure 4:
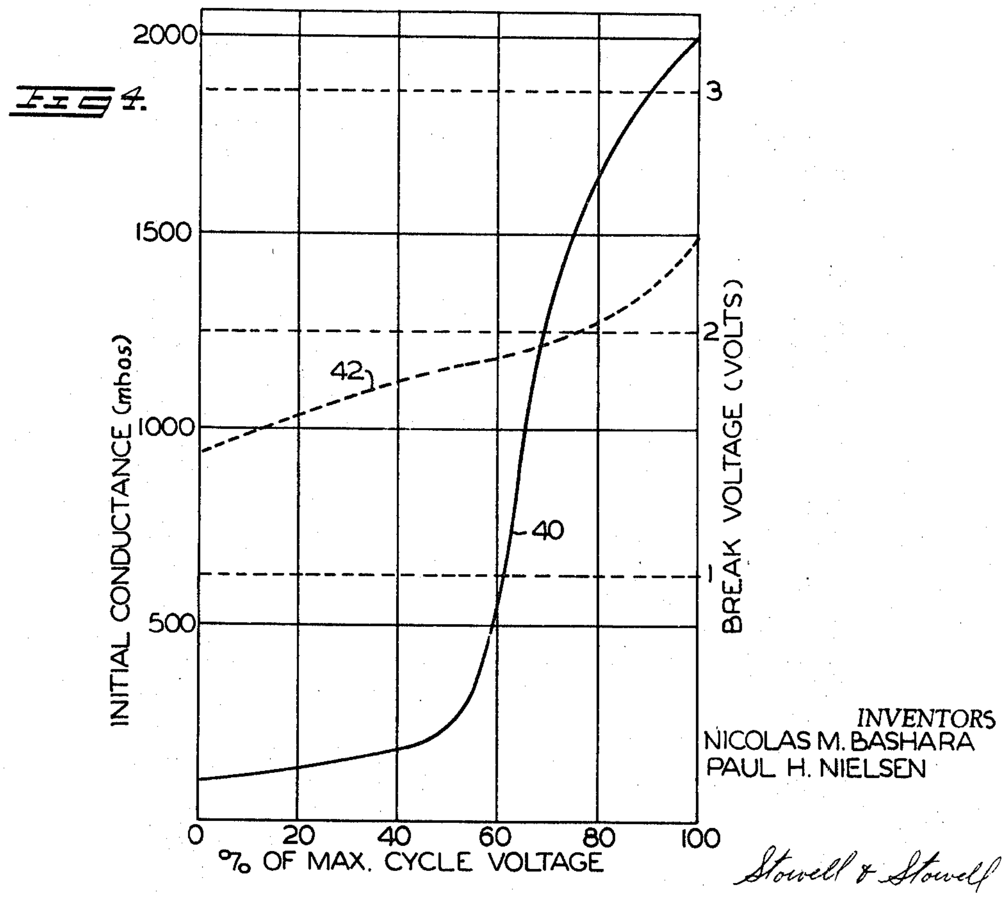

When the voltage was suddenly removed at a value of 7 volts with voltage increasing, the locus of the current-voltage characteristic changed markedly to a higher initial resistance as long as the voltage did not exceed the value for onset of negative resistance. For example, in FIG. 2 a 60-c.p.s. voltage slightly over one-volt peak was applied continuously for one hour with no apparent change in the value of initial resistance, graphically illustrating that the higher initial resistance induced by sudden removal of voltage at a value of 7 volts can be read out for at least one hour. In FIG. 2 the locus of the current-voltage plot at one-volt peak is seen as a straight, almost horizontal line 48 in the vicinity of the origin and has been superimposed on the normal negative resistance characteristic.

Further, the memory effect itself is relatively insensitive to a wide temperature range, although the absolute current magnitudes vary with temperature. The memory effect is present down to the temperature at which the negative resistance of the device disappears, somewhere in the vicinity of 180–200° K. For example, at approximately 225° K., the current through the device is about an order of magnitude lower than at room temperature. The initial conductance at the lowest temperature where the memory effect still persists, between 200 and 225° K., is approximately equal to the conductance at a temperature sufficiently low to eliminate both the negative resistance and memory effect. At these temperatures the current-voltage characteristic is the same for both increasing and decreasing voltage.

A memory effect has also been observed upon returning the device to room temperature after cycling at reduced temperatures. In this case normal cycling has taken place at approximately 200° K. with voltage increasing to a maximum and then decreasing to zero, etc. The voltage is removed from the device when it is at zero potential. This is in contrast to the previously described operation of a voltage dependent memory. The device is brought to room temperature without voltage cycling at intermediate temperature, and voltage is reapplied. At this time a memory effect is observed, that is, the conductance is lower and a break potential is observed as compared to normal cycling at room temperature. Again the effect occurs only on the first half cycle after reapplication of the voltage.

Removing the voltage at the maximum applied voltage and storing the device either in vacuum or at atmospheric pressure for periods up to 48 hours and reapplying the voltage starting at zero showed a conductance and break potential nearly exactly equal to that observed when only a half cycle elapsed from the time of voltage removal to reapplication; this being about 10 seconds when using the 0.05 c.p.s. waveform. In tests conducted above room temperature the device was heated to 150° C. for two hours, the voltage was removed at a maximum value of about 6 volts, the specimen was cooled to room temperature, and voltage was reapplied at zero. There was no detectable change from the values in conductance or the break point from that obtained when the voltage was removed for the half cycle of 10 seconds at room temperature.

Removing the voltage somewhere along the cycle and reversing the polarity of the voltage as it is started from zero gives the same conductance and break point as for the condition where the voltage is not reversed at zero.

The effects described are dependent on whether the voltage is removed on the increasing or decreasing part of the cycle. For example, if the voltage is removed on the decreasing half cycle, at the peak of curve 30, the initial conductance is less than and the break point more pronounced, curve 38, than when the voltage is removed at the same value but voltage increasing, shown in curve 32.

Table I shows the effect of applied voltage on the initial resistance, comparing resistance measurements calculated from the current-voltage plot with ohmmeter measurements. The latter measurement involved application of a voltage less than one volt to the sandwich device.

Tables II and III show parallel capacitance and Q for two different sandwich devices at a test frequency of 1000 c.p.s. The A-C test voltage is less than one-half volt to the device. The measurements were made immediately after sudden removal of the indicated voltages.

TABLE I

| | Ohmmeter resistance, ohms | Plot resistance, ohms |
|---|---|---|
| Removal voltage: | | |
| 0 | 150 | 110 |
| 4.0 | 1,500 | 1,250 |
| 5.9 | 6,500 | 2,000 |

TABLE II

| | Parallel capacitance | Q |
|---|---|---|
| Removal voltage: | | |
| 0 | $2.71\times10^{-2}$ | 0.032 |
| 2.8 | 2.7 | 0.029 |
| 4.8 | 2.8 | 0.019 |
| 6.9 | $18.\times10^{-3}$ | 0.052 |
| 7.0 | 1.14 | 0.026 |

TABLE III

| | Parallel capacitance | Q |
|---|---|---|
| Removal voltage: | | |
| 0 | $2.44\times10^{-2}\mu f$ | 0.031 |
| 2.7 | 2.54 | 0.011 |
| 5.6 | $1.09\times10^{-3}$ | 0.34 |
| 6.7 | 1.09 | 0.81 |
| 7.3 | 1.09 | 0.34 |

In certain experiments the current to the device was limited to the range of 10 to 50 ma. This is in contrast to cycling the device through a negative resistance characteristic where peak currents of up to about 400 ma. may exist. For example, a step voltage was applied to the device and then suddently removed, limiting the current to the range of 10 to 50 ma. The initial resistance with a removal voltage of about 7 volts and current limited to 10 ma. is about 550 ohms. This value of initial resistance can be maintained so long as a voltage less than about one volt is applied.

The magnitude of the initial resistance appears to be dependent on the degree of current limiting. This can be seen in Table IV, which lists values of initial resistance for various conditions of removal voltage and where the peak value of the removal voltage is about the same, 7 volts. The lowest value of initial resistance is about 550 ohms for the condition where the current was limited to a value of about 10 ma. For current limiting of 50 ma., the initial resistance is approximately 1000 ohms. The greatest value is obtained for 60-c.p.s. operation where no current limiting is used. Here the locus of the current-voltage characteristic in the vicinity of the origin is greater than 10,000 ohms. The initial resistance for a removal voltage of about 7 volts with no current limiting at a frequency of 0.05 c.p.s. has been shown to be greater than 2000 ohms.

TABLE IV.—INITIAL RESISTANCE AS A FUNCTION OF REMOVAL VOLTAGE, FREQUENCY AND CURRENT

| | | |
|---|---|---|
| Removal voltage 7 volts, normal cycling 0.05 c.p.s. | ohms | 2,000 |
| Removal voltage 7 volts, normal cycling 60 c.p.s. | do | 10,000 |
| Removal voltage 7 volts, step current, 50 ma. max. | approx. ohms | 1,000 |
| Removal voltage 7 volts, step current, 10 ma. max. | do | 550 |

To utilize the change in initial resistance in a circuit application it is desirable to have available a large change in resistance so that the lowest initial resistance that can be realized in this type of device is of direct interest. In specimens where the initial resistance can be increased to between 500 ohms and many kiloohms by the methods previously described, the initial resistance could be reversibly reduced to a value as low as 10 ohms typically. This transition from a large value of initial resistance to a small value can be effected by applying a step voltage approximately equal to the voltage for maximum current. To make a transition to a low value of initial resistance by application of a step voltage, a forming period which takes 5 to 10 sec. to complete is required. A forming period is commonly observed in thin film sandwich structures whether they be of the negative resistance type or not. Transition to a low value of initial resistance will not occur if the step voltage is too low.

It has been observed that light is emitted from the sandwich when the current-voltage characteristic is in the vicinity of peak current. When the current to the device is limited to a value of between 10 and 50 ma., the amount of light observed is considerably less than when the device is allowed to reach higher peak currents where no attempt was made to limit current by external means. For example, only intermittent light pulses are observed when the current is limited to 10 ma. In contrast, FIG. 5, which is taken from an oscillogram where the photomultiplier output was taken from a photograph with 60-c.p.s. voltage applied; $y$—0.5/div.; $x$—2 msec./div.; with a one-megohm anode load resistor, shows numerous large spikes of light on each half cycle at peak voltage of about 8 volts where the peak device current would be in the range of 100 to 400 ma.

It will be obvious to those skilled in the art that various modifications may be made within the concepts of the invention as described above. For example, materials other than gold may be utilized for the sandwich electrodes; and the silicon monoxide dielectric layer may, in certain instances, be replaced by an air gap, so long as a negative resistance structure is achieved.

To summarize the present invention, when a sandwich structure consisting of gold-silicon monoxide-gold is operated at a low pressure with a voltage applied to the gold electrodes of the sandwich, the current-voltage characteristic exhibits a negative resistance at a voltage between two and three volts. At the voltage where negative resistance occurs, the current decreases as voltage is increased. If the device is cycled with the voltage increased to a maximum voltage and then decreased back to zero, a typical current-voltage characteristic is obtained, having a negative resistance characteristic as voltage is increased, and as voltage is decreased, in the following manner. As voltage is increased the current increases until onset of negative resistance at which time the current decreases to a value which is nearly constant as voltage is increased further. Then as voltage is decreased from the maximum value the current remains at a low value until the voltage for maximum current is approached at which time the current increases rapidly and then decreases to zero as the voltage is decreased to zero.

It has been found that the initial resistance of the device can be markedly changed by removing the voltage suddenly and then increasing the voltage starting from zero. The value of the initial resistance depends upon the magnitude of the removal voltage. The initial resistance of the device whatever it is can be read out indefinitely, so long as the magnitude of the read-out voltage does not exceed a value which will change the conductance characteristics of the device. When the voltage for maximum current is exceeded, then the device reverts to the characteristic that it would have when cycled through increasing and decreasing voltage. The lowest initial resistance which has been achieved, about 10 ohms, is obtained by allowing the voltage to remain at a value somewhat less than that for onset of initial resistance where it is observed that the current will increase slowly to a maximum value. The highest resistance which has been achieved, greater than 10,000 ohms, is obtained by using 60-c.p.s. applied voltage and removing the voltage suddenly when the voltage is about 7-volts peak.

We claim:

1. A method of operating, as a data storage device, a thin film sandwich composed of a pair of metallic electrodes spaced apart by a thin dielectric portion which comprises the steps of:

applying a first low frequency voltage across said electrodes and terminating the application of said voltage at a point where said voltage is other than zero to precondition said sandwich;

applying a second low frequency voltage across said preconditioned sandwich; and reading the conductance of said preconditioned sandwich during the first half cycle of said second voltage to obtain an indication of the value of said first voltage.

2. A method of operating, as a data storage device, a thin film sandwich composed of a pair of metallic electrodes spaced apart by a thin dielectric portion which comprises the steps of:

applying a first low frequency voltage across said electrodes and terminating the application of said voltage at a point where said voltage is other than zero to precondition said sandwich;

applying a second low frequency voltage across said preconditioned sandwich; and reading the current-voltage characteristic of said preconditioned sandwich during the first half cycle of said second voltage to obtain an indication of the value of said first voltage.

References Cited

UNITED STATES PATENTS

| | | | |
|---|---|---|---|
| 2,836,766 | 5/1958 | Halsted | 315—151 |
| 2,975,377 | 3/1961 | Price | 340—173 |
| 3,017,613 | 1/1962 | Miller | 340—173 |
| 3,089,038 | 5/1963 | Rutz | 307—88.5 |
| 3,120,653 | 2/1964 | Miller | 340—173 |
| 3,160,863 | 12/1964 | Partovi | 340—174 |
| 3,218,616 | 11/1965 | Huijer | 340—174 |

TERRELL W. FEARS, Primary Examiner

U.S. Cl. X.R.

307—88, 238; 317—258